Feb. 23, 1965 W. D. VOELKER 3,170,827
REINFORCED PANEL PRODUCTION
Filed Feb. 8, 1962
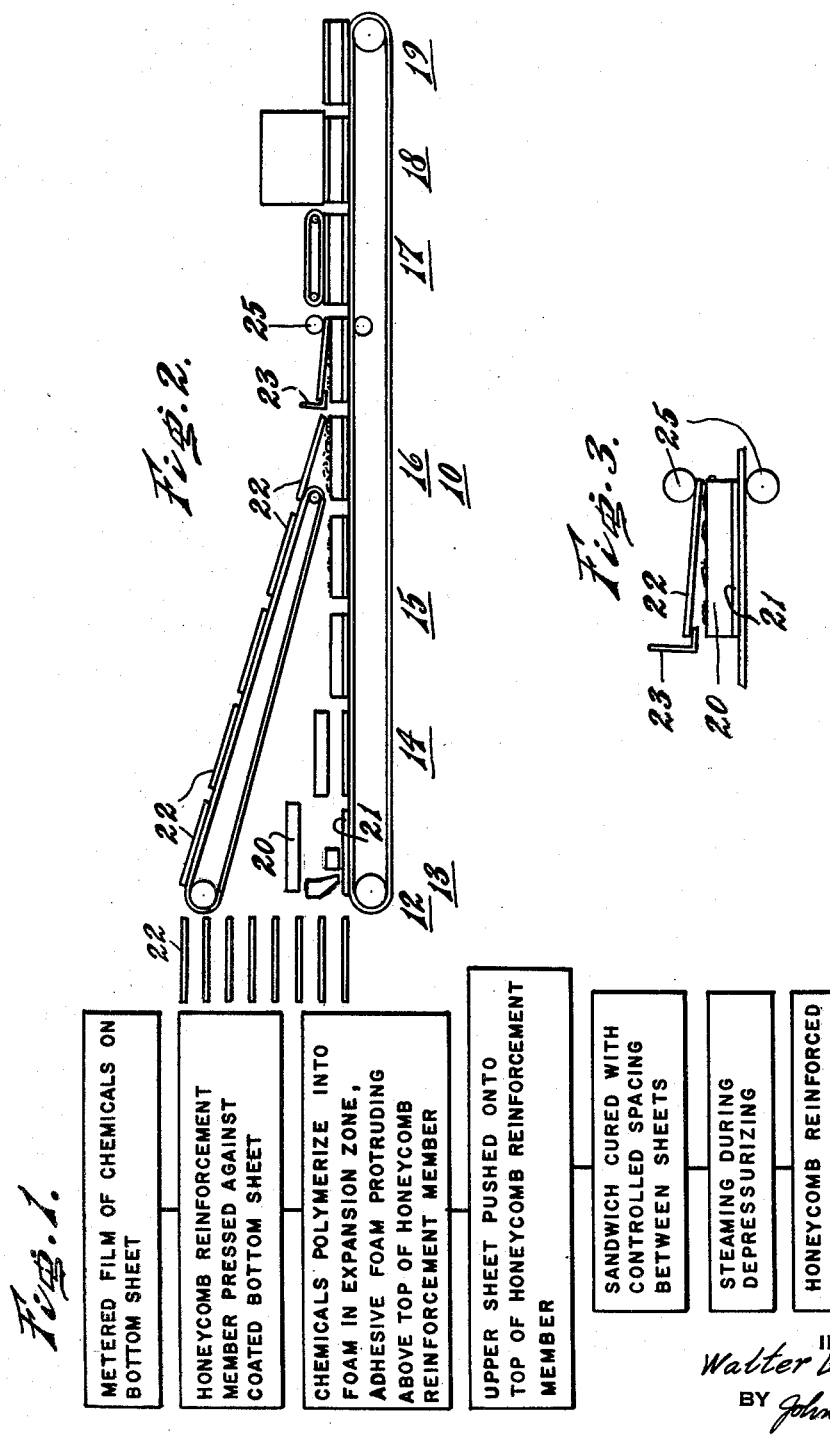
INVENTOR,
Walter D. Voelker
BY John R. Eubank
ATTORNEY United States Patent Office 3,170,827
Patented Feb. 23, 1965

3,170,827
REINFORCED PANEL PRODUCTION
Walter D. Voelker, Philadelphia, Pa., assignor to Union Carbide Corporation, New York, N.Y., a corporation of New York
Filed Feb. 8, 1962, Ser. No. 171,939
3 Claims. (Cl. 156—78)

This invention relates to the manufacture of polyurethane foam panels comprising facing sheets and a core of polyurethane foam reinforced with honey comb paper.

Previously panels comprising a core of polyurethane foam reinforced with honeycomb paper have been prepared by the formation of the polyurethane in and around the expanded honeycomb paper, followed by the slicing of the two irregular faces to provide a core member of resonably uniform characteristics, followed by the lamination of the facing sheets onto the core member. Inasmuch as considerable labor was required for the series of operations such panels were so expensive as to be useful only for specialized applications, such as an aircraft.

In accordance with the present invention, polyurethane foam panels having a sandwich structure are prepared by a method which includes the steps of depositing a layer of foam-forming chemicals onto a bottom facing sheet, advancing the coated sheet to a reinforcement placement zone in which one edge of the honeycomb reinforcement member is pushed through the layer of chemicals into bonding relationship with the bottom facing sheet, and the combination of bottom facing sheet, layer of chemicals, and honeycomb paper is advanced through an expansion zone, in which the foam forming chemicals interact to generate polyurethane foam which rises within the tubes of the honeycomb paper, eventually rising high enough to be foaming slightly above the upper surface of the honeycomb reinforcing member. Of particular importance, the upper facing sheet is placed upon the combination of the lower facing sheet, honeycomb reinforced polyurethane foam and the small of polyurethane foam above the honeycomb member while the polyurethane foam retains a significant amount of adhesiveness, and the upper facing sheet is pressed down so that the facing sheet bonds with the upper edges of the honeycomb paper. The combination of the bottom facing sheet, honeycomb reinforcing member and upper facing sheet is advanced through a curing zone while maintaining the spacing between the upper and lower facing sheets at exactly the height of the honeycomb reinforcement member. Thus, during the curing of the polyurethane foam, sufficient pressure is maintained between the facing sheets to maintain said predetermined distance. The polyurethane foam undergoes polmerization reactions to be transformed into a rigid structure in the curing zone, so that the existence of superatmospheric pressure in the gas in the pores of the rigid structure does not impair the usefulness of the panel in its normal applications. In order to minimize the possibility of explosive release of the compressed gas, the sandwich structure, after leaving the curing zone, passes through a depressurizing zone, in which the panel is treated with hot steam and warm air to promote the dissipation of the excess gas pressure and the stabilizing of the rigid foam structure. The stabilized panels are advanced to a product removal zone.

The nature of the invention is further clarified by reference to the acompanying drawings. FIGURE 1 is a flow-sheet and schematic showing of the series of steps involved in the panel production. FIGURE 2 is a schematic representation of a machine adapted to produce reinforced insulating panels. FIGURE 3 is a schematic showing of an embodiment of the lay-down stage of the machine of FIGURE 2.

Referring to the drawings there is shown a machine 10 adapted to advance a series of bottom facing sheets 21 through a series of zones including a coating zone 12, metering zone 13, honeycomb placement zone 14, expansion zone 15, upper sheet lay down zone 16, pressurized curing zone 17, depressurizing zone 18 and product removal zone 19. It is convenient to describe the production of building panels having facing sheets of asbestos cement board, and separated by approximately six inches of polyurethane foam reinforced with honeycomb paper having hexagonal tubes which have a width of from about ¼ inch to about ⅞ inch. Such insulation panels have the advantage of being equipped with faces which are smooth, easily cleaned, and weather resistant. The reinforced polyurethane structure imparts to the panels sufficient strength that the panels can span distances such as 8 feet without troublesome sagging. The panels comprise polyurethane foam having a density of about three pounds per cubic foot and bonded to the honeycomb paper at each point of contact.

A supply stack of bottom facing sheets is positioned so that a sheet may be shifted from the stack to an advancing belt. The sheet 21 passes through a coating zone 12 in which a layer of polyurethane chemicals is applied to the sheet 21 which advances through a metering zone 13 adapted to prevent excess coating material from advancing further through the machine. As the panel leaves the metering zone 13, it has a uniform coating of predetermined thickness corresponding to that necessary to provide the thickness and density of foam required for the panel. Particular attention is directed to a honeycomb placement zone 14 in which a honeycomb reinforcement member 20 having essentially the same size as the facing sheet 21 is pushed into contact with the facing sheet 21, thereby forcing the chemicals to rise in the tubes of the honeycomb member to a height very slightly greater than that of the metered thickness of the coating. The bottom edge of the honeycomb member is pressed into contact with the facing sheet 21. The combination of the bottom facing sheet 11, honeycomb reinforcement member 20, and the coating of polyurethane foam-forming chemicals advances to an expansion zone 15, in which the chemicals interact with each other to generate polyurethane foam. The composition undergoing the foaming reaction rises from the bottom facing sheet 21 into the tubes of the honeycomb reinforcement member 20 until the expansion brings about a very slight overflowing above the top of honeycomb reinforcement member 20.

Particular attention is directed to the zone 16 in which the upper sheet 22 is laid down upon the polyurethane composition and pushed into contact with the upper edges of the honeycomb reinforcement member 20. Although the facing sheet 22 is relatively brittle and cannot be flexed to a great extent, the length of the upper sheet 22 is sufficient to permit the bending of the sheet throughout its length to an extent of a least one inch, so that the advancing combination can be pushed into contact with the advancing upper facing sheet 22 with an advancing line of contact therebetween. The upper sheet may be fed onto the advancing combination at a small angle so that the front advancing edge of the upper facing sheet 22 is brought into contact with the advancing combination slightly prior to the time when the rear edge is pushed into contact with the combination. A pair of rollers 25 serves to push the advancing upper sheet 22 onto the advancing combination of lower sheet 21 and honeycomb reinforcement member 20. The polyurethane foam which rises to a height greater than the height of the honeycomb reinforcement member 20 tends to be pushed and compressed into the tubes of the honeycomb reinforcement member 20, but a portion may be squeezed rearwardly as the pair of rollers 25 presses the upper sheet 22 into its intended position.

The sandwich structure comprising the lower sheet 21, honeycomb reinforcement member 20, polyurethane foam, and upper sheet 22, advances from the pair of rollers 25 through a curing zone 17 in which a pair of endless belts maintain the predetermined thickness for the sandwich while it is heated at an appropriate curing temperature. Because the predetermined thickness is maintained in the curing zone 17, it is convenient to refer to it as a pressurized curing zone. After substantially all of the chemical reactions readily and rapidly promoted by heat are accomplished in the pressurized curing zone 17, the sandwich structure advances into a depressurizing zone 18 in which the product is stabilized. It is sometimes desirable to employ heat, humidity, and steam in a steam oven in zone 18. After the stabilized panel has passed thru the zone 18, it advances to the product removal zone 19.

Various modifications and variations in the invention are possible without departing from the scope of the invention as set forth in the claims.

Glossary: In the claims, the term "honeycomb reinforcement member" designates a paper reinforcing member defining a plurality of contiguous hexagonal tubes, the height of the tubes corresponding substantially to the distance between the inner faces of the two facing sheets of the sandwich panel.

The invention claimed is:

1. The method of preparing a sandwich structure comprising upper and lower facing sheets with a polyurethane foam core reinforced with a honeycomb reinforcement member disposed therebetween which method comprises (1) advancing a lower facing sheet from a feed position through a coating zone wherein the said sheet is coated with a layer of predetermined thickness of chemicals entirely in liquid phase which are capable of interacting to produce polyurethane foam, (2) advancing the thus coated facing sheet through a reinforcement placement zone wherein a honeycomb reinforcement member is pressed against the said coated sheet and into bonding relationship therewith, (3) advancing the said coated sheet and contiguously disposed honeycomb reinforcement member through an expansion zone wherein chemical reaction proceeds and the said coating generates a polyurethane foam which rises within the tubes of the said honeycomb reinforcement member to a level slightly above the upper surface thereof, the air in the said tubes being displaced by the rising foam, (4) advancing the thus formed structure comprising the lower facing sheet and contiguously disposed foam over-filled honeycomb reinforcement member through a lay-down zone wherein an upper facing sheet is pressed upon the foam over-filled honeycomb reinforcement member and compresses the excess foam into the tubes of the said honeycomb reinforcement member, (5) advancing the thus formed structure comprising upper and lower facing sheets and foam-filled honeycomb reinforcement member disposed therebetween through a curing zone wherein the foam is cured by application of heat while pressure is applied to the said structure to maintain the upper facing sheet in bonding contact with the honeycomb reinforcement member, producing thereby a structure wherein the honeycomb reinforcement member is bonded to both upper and lower facing sheets, and (6) withdrawing in a product withdrawal zone a sandwich structure comprising upper and lower facing sheets having a polyurethane foam core reinforced with a honeycomb reinforcement member disposed therebetween.

2. The method of claim 1 wherein said upper and lower facing sheets are continuous sheets of flexible sheet material.

3. The method of claim 1 wherein said upper and lower facing sheets are provided as a series of separate panels of rigid sheet material and said honeycomb reinforcement member is provided in corresponding sections.

References Cited in the file of this patent
UNITED STATES PATENTS

| | | |
|---|---|---|
| 2,744,042 | Pace | May 1, 1956 |
| 2,816,852 | Banks | Dec. 17, 1957 |
| 2,866,730 | Potchen | Dec. 30, 1958 |
| 2,910,396 | Randall | Oct. 27, 1959 |
| 2,983,636 | Runton | May 9, 1961 |
| 3,046,177 | Hankins | July 24, 1962 |
| 3,079,289 | George | Feb. 26, 1963 |